US012618496B1

(12) United States Patent
Coolidge

(10) Patent No.: US 12,618,496 B1
(45) Date of Patent: May 5, 2026

(54) BONDING AND SEALING SYSTEM AND METHOD OF USE

(71) Applicant: Robert Coolidge, Alvarado, TX (US)

(72) Inventor: Robert Coolidge, Alvarado, TX (US)

( * ) Notice: Subject to any disclaimer, the term of this patent is extended or adjusted under 35 U.S.C. 154(b) by 63 days.

(21) Appl. No.: 18/680,607

(22) Filed: May 31, 2024

Related U.S. Application Data

(63) Continuation of application No. 18/381,531, filed on Oct. 18, 2023, now abandoned.

(60) Provisional application No. 63/458,351, filed on Apr. 10, 2023.

(51) Int. Cl.
| | |
|---|---|
| *B29C 65/00* | (2006.01) |
| *F16F 15/32* | (2006.01) |
| *F16F 15/36* | (2006.01) |
| *F16L 13/11* | (2006.01) |
| *B29C 65/48* | (2006.01) |

(52) U.S. Cl.
CPC ............. *F16L 13/11* (2013.01); *F16F 15/324* (2013.01); *F16F 15/366* (2013.01); *B29C 65/48* (2013.01); *B29C 66/51* (2013.01); *B29C 66/632* (2013.01)

(58) Field of Classification Search
CPC ....... B29C 65/48; B29C 66/51; B29C 66/632; F61L 13/11
See application file for complete search history.

(56) References Cited

U.S. PATENT DOCUMENTS

| | | | | |
|---|---|---|---|---|
| 5,503,464 A | * | 4/1996 | Collura | F16F 15/366 |
| | | | | 301/5.22 |
| 6,267,450 B1 | * | 7/2001 | Gamble | F16F 15/36 |
| | | | | 301/5.22 |
| 2014/0091649 A1 | * | 4/2014 | Dragon | H02K 11/012 |
| | | | | 29/598 |
| 2021/0246595 A1 | * | 8/2021 | Papsdorf | D06F 37/225 |

OTHER PUBLICATIONS

Belzona 5815 description (Year: 2022).*

* cited by examiner

*Primary Examiner* — Philip C Tucker
*Assistant Examiner* — Nickolas R Harm
(74) *Attorney, Agent, or Firm* — Richard Eldredge; Leavitt Eldredge Law Firm

(57) ABSTRACT

A bonding and sealing system for coupling a joint of a circular tube to be utilized in the manufacturing of an automatic balancer is disclosed. The system includes a circular tube having a joint and a fluid; and a predetermined amount of Belzona 5815®; wherein the predetermined amount of Belzona 5815® bonds and seals the joint, thereby securing the fluid within the circular tube; wherein the application of Belzona 5815® over the joint forms a balancing ring to be used to create an automatic balancer.

4 Claims, 2 Drawing Sheets

BONDING AND SEALING SYSTEM AND METHOD OF USE

BACKGROUND

1. Field of the Invention

The present invention relates generally to bonding and sealing systems, and more specifically to a bonding and sealing system for coupling a joint of a circular tube to be utilized in the manufacturing of an automatic balancer.

2. Description of Related Art

Bonding and sealing systems are well known in the art and are effective means to couple at least two objects together to form a unitary structure. Common bonding and sealing methods include the prepping of objects to be coupled followed by an application of various bonding agents. Examples of bonding agents include epoxy bonding agents, acrylic latex bonding agents, polyvinyl acetate agents, and the like.

One of the problems commonly associated with common bonding and sealing systems is limited their efficiency. For example, current bonding and sealing systems do not offer the resilience and longevity required for use in the manufacture of an automatic balancer. This leads to frequent replacements which is prohibitively expensive.

Accordingly, although great strides have been made in the area of bonding and sealing systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
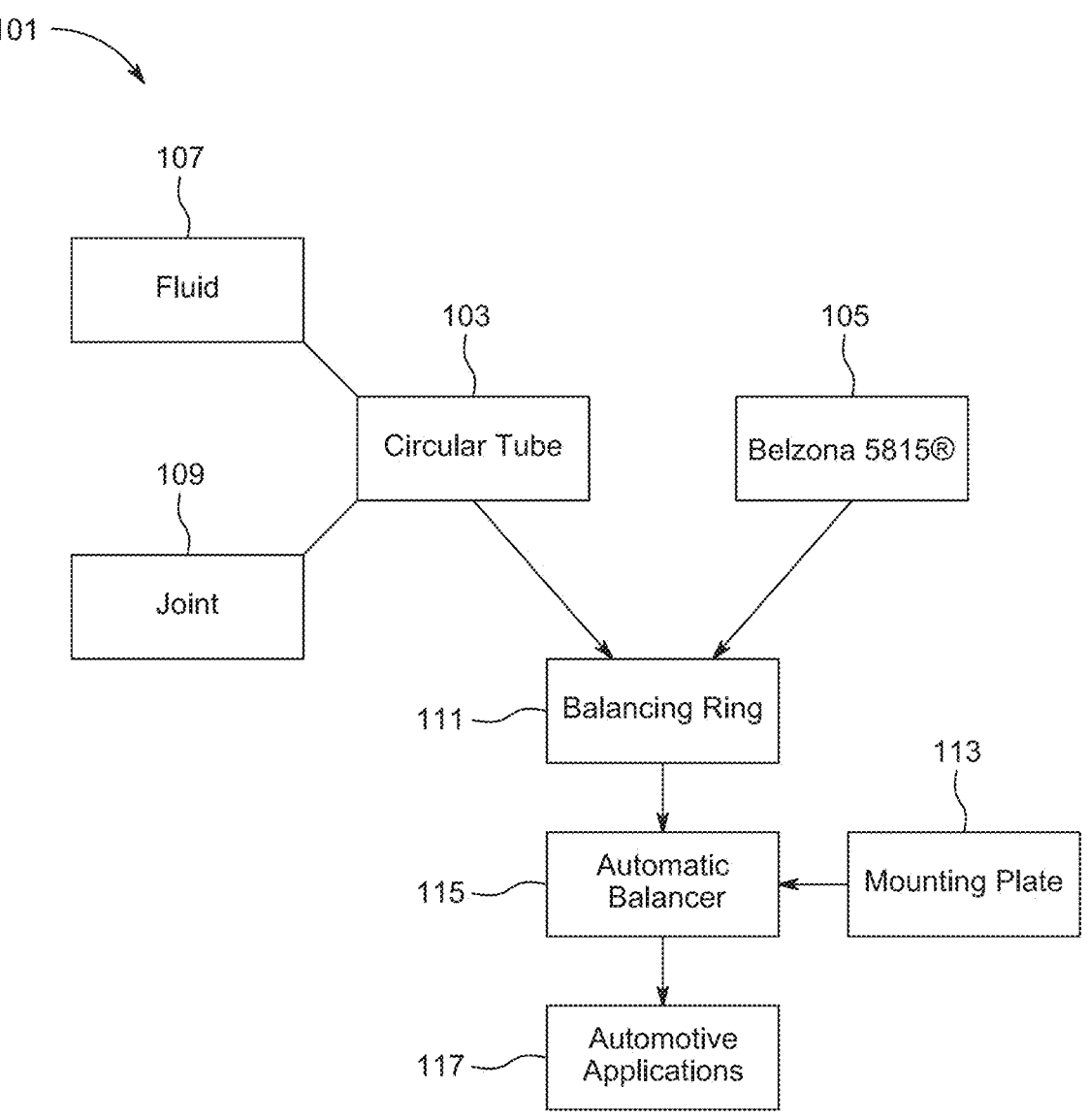
FIG. 1 is a schematic representation of a bonding and sealing system in accordance with a preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional bonding and sealing systems. Specifically, the present invention provides a means for preparing a joint of a circular tube for bonding and sealing, wherein the circular tube is used as part of an automatic balancer. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic representation of a bonding and sealing system 101 in accordance with a preferred embodiment of the present application. It will be appreciated that system 101 overcomes one or more of the above-listed problems commonly associated with conventional bonding and sealing systems.

In the contemplated embodiment, system 101 includes a circular tube 103 and an amount of Belzona 5815® 105. It should be appreciated that those skilled in the art will understand the use of Belzona 5815®.

In the preferred embodiment, the circular tube 103 includes a fluid 107 contained therein and a joint 109. A balancing ring 111 is formed when Belzona 5815® 105 is applied to bond and seal the joint 107 thereby securing the fluid 107 within the circular tube 103. A mounting plate 113 or other apparatus combines with the balancing ring 111 to form an automatic balancer 115 which can then be employed in automotive applications 117 such as tire and wheel balancing.

In addition, in the preferred embodiment, the circular tube 103 is composed of aluminum and the fluid 105 is composed of a synthetic moly fluid.

It should be noted that the joint 109 is cleaned and abraded prior to the application of Belzona 5815® 105 thereon. In addition, it should be noted that the application of Belzona 5815® 105 follows manufacturer instructions.

Figure 2:
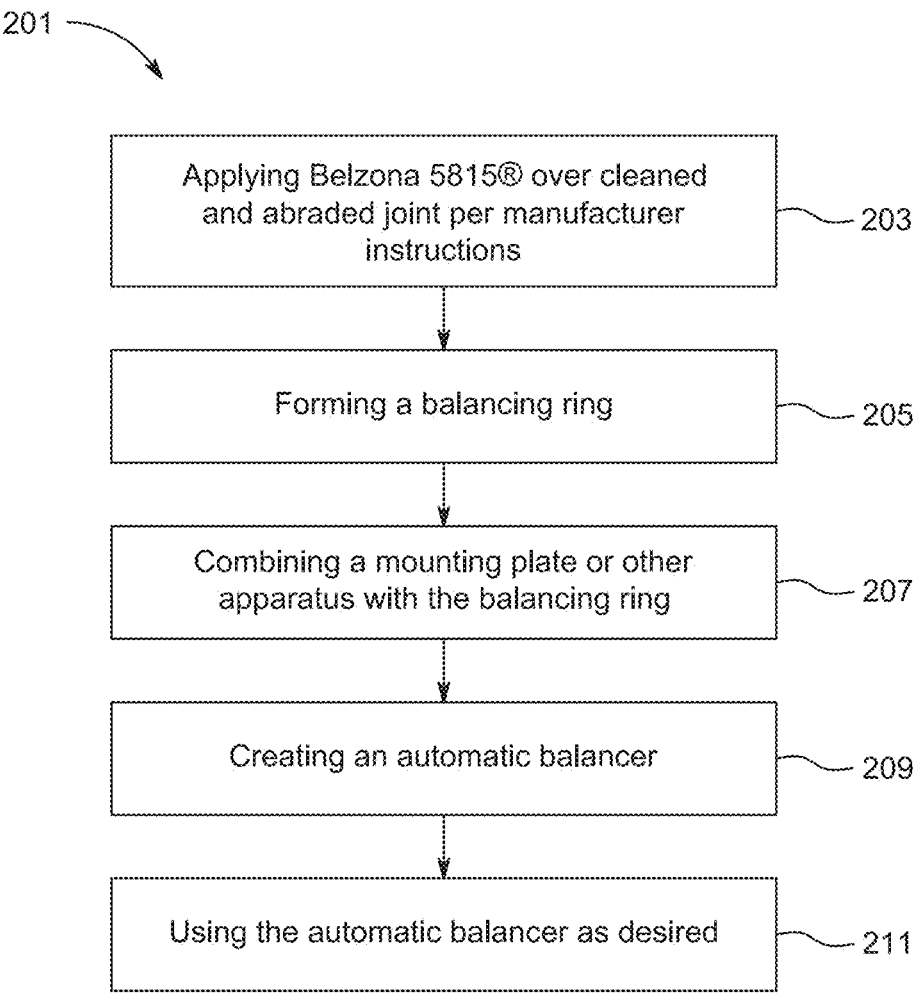
FIG. 2 is a flowchart of a method of use of the bonding and sealing system of FIG. 1.

In FIG. 2, a flowchart 201 depicts a method of use for system 101. First, the joint is cleaned and abraded and an amount of Belzona 5815® is applied over the joint as per manufacturer's instructions, forming a balancing ring, as shown with boxes 203, 205. Then, a mounting plate or other apparatus combines with the balancing ring to create an automatic balancer, as shown with boxes 207, 209. The automatic balancer can be used as desired by the user, such as tire and wheel balancing in automotive applications, as shown with box 211.

It should also be appreciated that one of the unique features believed characteristic of the present application is that it extends the longevity of an automatic balancer, thereby providing long-term cost savings.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A bonding and sealing system, comprising:
a circular tube having a joint and a fluid; and
a predetermined amount of coating material;
wherein the predetermined amount of coating bonds and seals the joint, thereby securing the fluid within the circular tube;
wherein the bonded and sealed joint creates a balancing ring; and
wherein the fluid is composed of a synthetic lubricant with molybdenum disulfide.

2. The bonding and sealing system of claim 1, wherein the circular tube is composed of aluminum.

3. A method for bonding and sealing a joint of a circular tube to be utilized in the manufacturing of an automatic balancer, the method comprising:
providing the system of claim 1;
forming a balancing ring, wherein the balancing ring is combined with a mounting plate to create an automatic balancer; and
using the automatic balancer for tire and wheel balancing in automobiles;
wherein the fluid is composed of a synthetic lubricant with molybdenum disulfide.

4. The method of claim 3, wherein the circular tube is composed of aluminum.

* * * * *